United States Patent [19]

Huang

[11] Patent Number: 5,296,248
[45] Date of Patent: Mar. 22, 1994

[54] METHOD FOR CRACKING WALNUTS AND RECOVERY OF NUT MEAT THEREFROM

[75] Inventor: Chi-Tai Huang, Manhattan, Kans.

[73] Assignee: Kansas State University Research Foundation, Manhattan, Kans.

[21] Appl. No.: 992,266

[22] Filed: Dec. 14, 1992

[51] Int. Cl.⁵ .................... A23L 1/10; A23P 1/00
[52] U.S. Cl. ............................. 426/482; 426/518
[58] Field of Search ................ 426/482, 483, 518

[56] References Cited

U.S. PATENT DOCUMENTS

| | | | |
|---|---|---|---|
| 2,067,566 | 1/1937 | Field | 426/482 |
| 2,154,412 | 4/1939 | Romberg et al. | 426/482 X |
| 2,558,899 | 7/1951 | Green | 426/482 |

OTHER PUBLICATIONS

Hammons Products Company Brochure of Stockton, Mo. (Undated).

*Primary Examiner*—Leo B. Tentoni
*Attorney, Agent, or Firm*—Hovey, Williams, Timmons & Collins

[57] ABSTRACT

An improved method and apparatus for the cracking of walnuts (30) is provided, and particularly Eastern black walnuts, wherein the surfaces of the shells (32) of the walnuts (30) are first altered to present compression zone(s) (132, 134), and the walnuts (30) are then cracked by subjecting the shells (32) thereof to opposed compressive forces serving to crack the shells (32) while leaving nut meat kernels intact. Preferably, the walnut shells (32) are sanded adjacent the opposed upper and lower ends (34, 36) thereof to present the zones (132, 134), with subsequent compression cracking of the shells (32), leaving a substantial fraction of the internal nut meat intact.

13 Claims, 3 Drawing Sheets

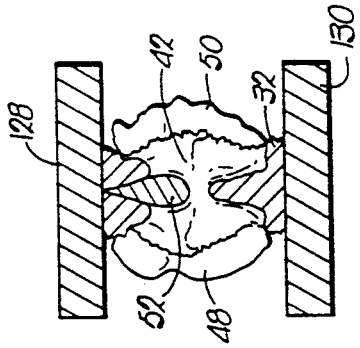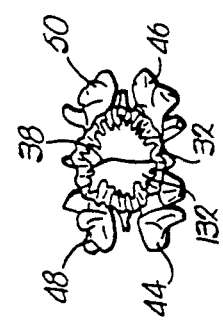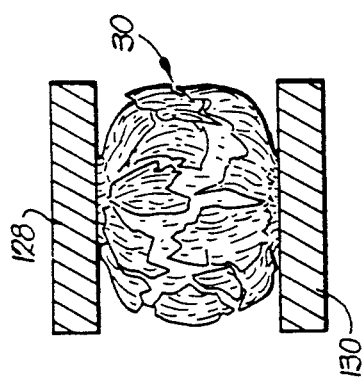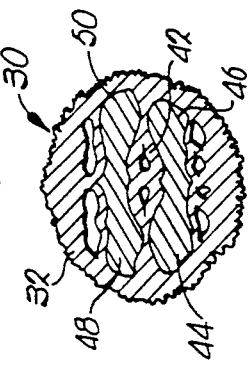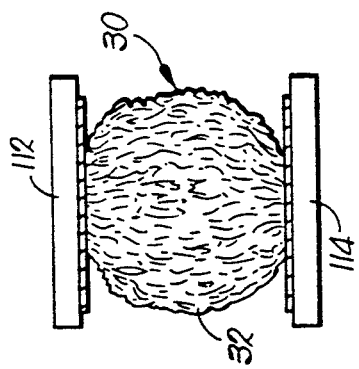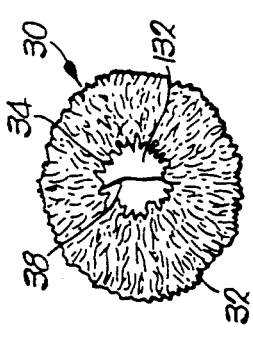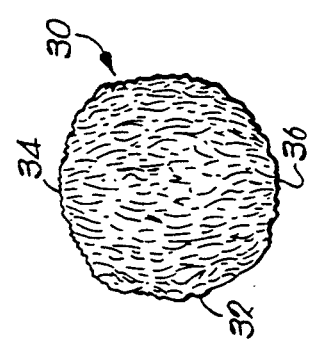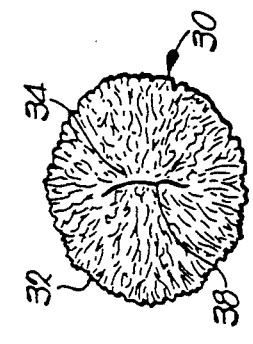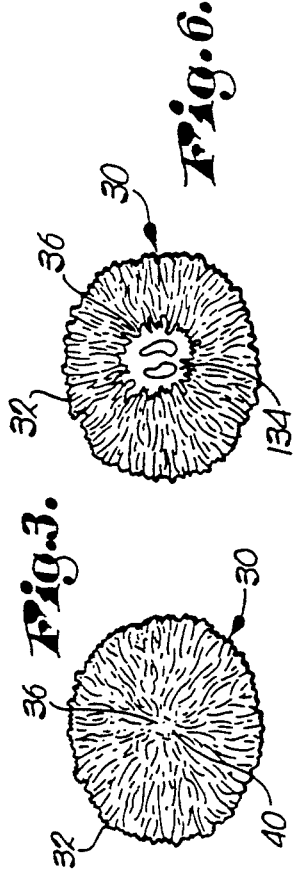

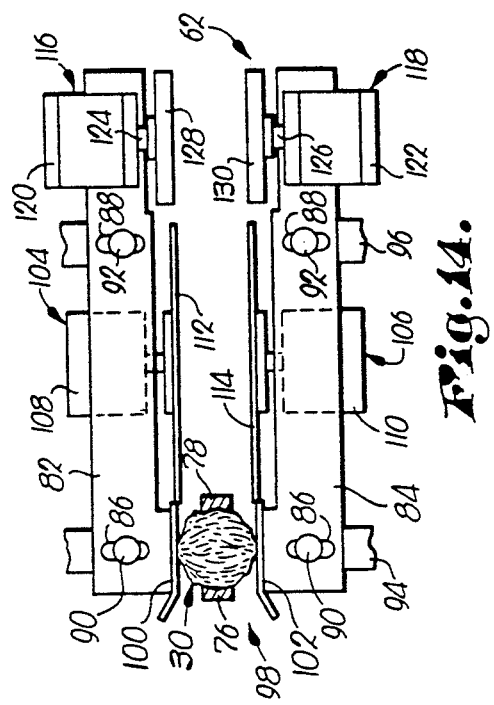
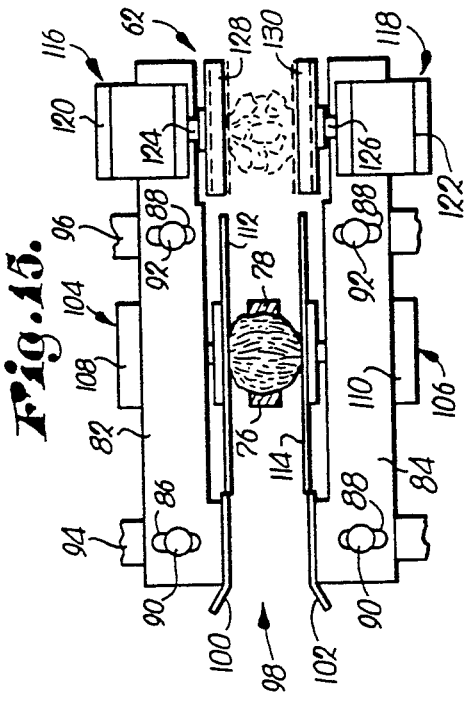
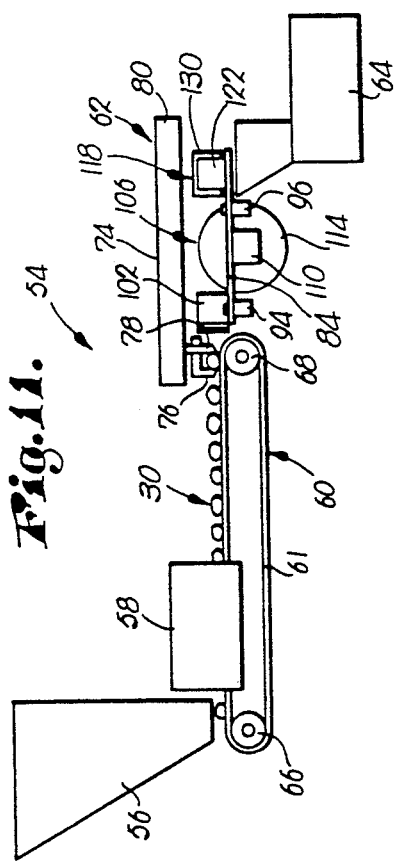
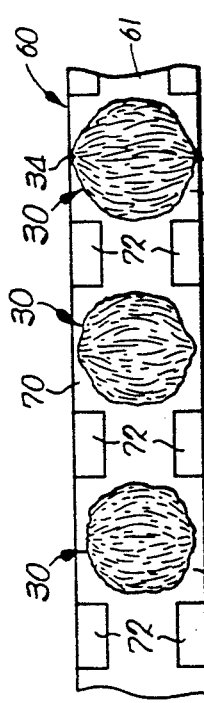
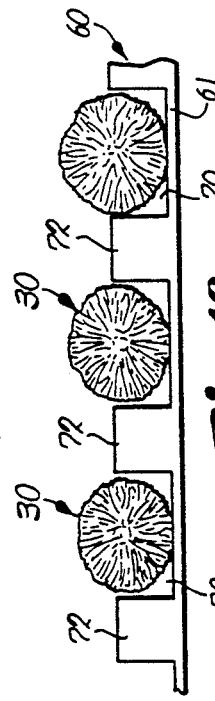

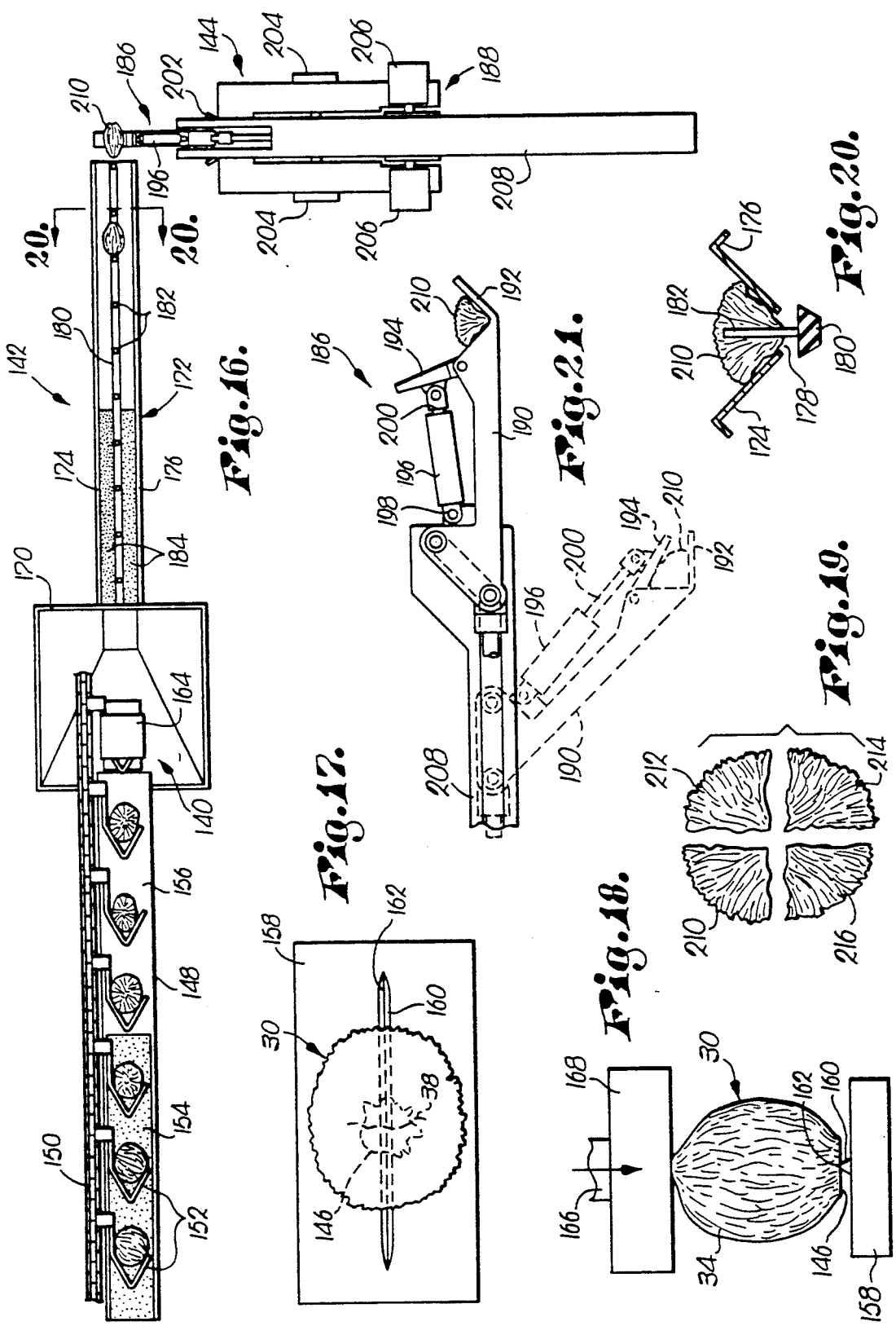

METHOD FOR CRACKING WALNUTS AND RECOVERY OF NUT MEAT THEREFROM

BACKGROUND OF THE INVENTION

1. Field of the Invention

The present invention is broadly concerned with an improved method and apparatus for cracking of walnuts (especially Eastern black walnuts, Juglans nigra) and recovery of nut meat therefrom. More particularly, the invention is concerned with the method and apparatus which increases not only the gross yield of nut meat, but also gives appreciably more of valuable large nut meat kernels, as opposed to smaller, comminuted nut meat fragments. Broadly, the invention involves altering the surface configuration of walnut shells and thereafter cracking the surface-altered walnut shells by subjecting them to compressive forces; this serves to crack the hard walnut shells while leaving a greater proportion of the internal kernels intact.

2. Description of the Prior Art

Eastern black walnuts are an important food item in American society. Black walnut kernels contribute considerably to the flavors of candy, ice cream and bakery products. They can also serve as a dietary supplement which is rich in phosphorus, iron, and vitamins $B_1$ and A. Accordingly, black walnut meat is a premium food product commanding a relatively high price.

Black walnuts are one of the most difficult nuts to crack among all hard-shelled nuts. There are basically three directions from which compressive, cracking pressure can be applied: (1) end-to-end along the longitudinal axis; (2) side-to-side across the narrowest lateral dimension; and (3) side-to-side along the widest lateral dimension. However, black walnuts vary in size and the large number of species makes it difficult to uniformly treat and handle the nuts for maximum yield of meat.

Cracking and shelling machines for black walnuts became available in about 1935, but the industry did not become firmly established until about 1945. These machines generally include a pair of hard metallic cracking rolls which receive the walnuts and crack the shells thereof during passage between the rolls. Thereafter, the mixed cracked shells and nut meat kernels are passed through a series of rollers with saw-like teeth, which separate the nut meat from the shells. The nut kernels are then sorted and graded and are ready for packaging.

A persistent problem with existing processing equipment is the relatively low yield of nut meat which can be obtained. Generally speaking, from 220 pounds of black walnuts a commercial sheller may expect slightly more than 15 pounds of saleable top grade kernels, giving a yield of about 7%. Current commercial yields of nut meat range from about 6.5-9.5% by weight wet basis, whereas the theoretical yield from black walnuts is approximately 21.5% by weight wet basis.

Additionally, current commercial shelling methods tend to produce an inordinately high percentage of small pieces, as opposed to the most desirable and valuable fancy large pieces. At current prices, small nut meat pieces are sold at retail at approximately $2.00 per pound, whereas the fancy large pieces are sold at about $5.00 per pound.

There is accordingly a decided need in the art for an improved method and apparatus for commercial scale shelling of black walnuts and recovery of nut meats, wherein both the gross yield and the percentage of large kernels are increased.

SUMMARY OF THE INVENTION

The present invention overcomes the problems outlined above, and provides an improved method and apparatus for cracking of walnuts in order to enhance the recovery of nut meat therefrom. Broadly speaking, the surfaces of the shells of walnuts are first altered to present thereon at least one compression zone, whereupon the altered walnuts are cracked by subjecting them to opposed compressive forces at the compression zones and at points substantially opposite the compression zones. The surface alterations in accordance with the invention serve to distribute compressive forces during cracking in order to permit cracking of the shells while leaving portions of the nut meats thereof intact. Thereafter, the nut meats can be readily recovered from the cracked walnuts in enhanced yield.

In preferred forms, a pair of compression zones are created on each walnut shell, and specifically at the top and bottom regions thereof, by abrading the walnuts to present opposed, flattened zones. The walnuts are then subjected to compressive cracking forces, typically by means of a pair of shiftable plates. This serves to crack the surrounding walnut shells, leaving (in the ideal form) a central shell column with four large, substantially intact kernels disposed about the column. These kernels can then be readily stripped from the shell column in good yield.

In alternative forms, only a single compression zone can be formed on the walnut shells, specifically at the top thereof in the region of the characteristic natural fault line. Thereafter, the walnuts are placed upon a compression plate presenting an upstanding, elongated protruding element presenting a sharp, walnut shell-engaging edge, with the natural fault line being transverse to the longitudinal axis of the edge. An opposed, shiftable compression plate is then used to engage the opposite end of the walnut shell, which serves to crack the nut into four quadrants, each including a shell segment and an attached nut meat kernel. In this form of the invention, the walnut quadrants are then subsequently treated by surface abrading the opposed ends of each shell segment, and compressing the quadrants at these regions to separate the nut meat kernels.

In a still further embodiment, the walnut shells may be cut or sawed substantially along the length of the natural fault line to a depth of up to about 2 cm and a length of up to about 3 cm. Thereupon, the cut walnuts are placed between a pair of opposed compression plates, with one plate in engagement with the cut region and the opposite plate engaging the bottom of the walnut. Displacement of the plates serves to crack the shells, leaving the nut meat kernels readily recoverable.

BRIEF DESCRIPTION OF THE DRAWINGS

FIG. 1 is a side view of a typical Eastern black walnut;

FIG. 2 is a top view thereof, illustrating the characteristic natural fault line present on the walnut shell;

FIG. 3 is a bottom view of the nut illustrated in FIGS. 1 and 2;

FIG. 4 is a schematic view illustrating the preferred surface alteration performed on the walnut shell to create opposed compression zones at the top and bottom of the walnut shell;

FIG. 5 is a top view of the walnut after the FIG. 4 surface alteration has been completed, illustrating the compression zone at the top of the nut;

FIG. 6 is a bottom view of the walnut after the FIG. 4 surface alteration has been completed, illustrating the compression zone at the bottom of the nut;

FIG. 7 is a schematic view illustrating the step of cracking of the walnut shells by applying compressive forces to the previously prepared compression zones;

FIG. 8 is a schematic view illustrating the central column sections of the walnut shell, with attached nut meat kernels, after the majority of the walnut shell has been separated due to the compression cracking illustrating in FIG. 7;

FIG. 9 is a top view of the configuration of the walnut illustrated in FIG. 8;

FIG. 10 is a sectional view of a complete Eastern black walnut, depicting the central shell column and surrounding shell, and with the valuable nut meat also being shown;

FIG. 11 is a generally schematic, side elevational view of a preferred walnut shelling apparatus in accordance with the invention;

FIG. 12 is a fragmentary top view illustrating the orientation of the walnuts on the conveyor and prior to entering the cracking station of the apparatus;

FIG. 13 is a side view of the conveyor and walnuts depicted in FIG. 12;

FIG. 14 is a fragmentary top view illustrating the preferred walnut cracking station forming a part of the overall apparatus;

FIG. 15 is a top view similar to that of FIG. 14, but depicting the operations performed in the cracking station;

FIG. 16 is a somewhat schematic plan view of an alternative walnut cracking apparatus;

FIG. 17 is an enlarged plan view depicting the orientation of a walnut to be cracked as it rests on one of the opposed cracking plates;

FIG. 18 is a side elevational view illustrating a walnut between opposed cracking plates in the embodiment of FIGS. 16–17;

FIG. 19 is a top view illustrating separation of a starting walnut into four individual quadrants;

FIG. 20 is a sectional view taken along line 20—20 of FIG. 16 and illustrating a walnut quadrant after being oriented in the FIG. 16 apparatus for subsequent nut meat separation; and FIG. 21 is a fragmentary side view illustrating the nut quadrant pickup apparatus employed for pick up and subsequent processing of oriented nut quadrants.

DETAILED DESCRIPTION OF THE PREFERRED EMBODIMENTS

Turning now to the drawings, and particularly FIGS. 1–3 and 10, a typical Eastern walnut 30 is illustrated. The walnut 30 includes a very hard, coarse woody outer shell 32 as well as a top 34 and opposed bottom 36. The top 34 (FIG. 2) has a characteristic, elongated natural fault line 38 therein whereas the bottom 36 typically presents a somewhat peaked tip region 40. As best seen in FIGS. 2, 3 and 10, the walnut is somewhat oval in cross-section presenting major and minor axes. Internally (FIG. 10) the walnut shell 32 presents central column segments 42 with four nut meat kernels 44, 46, 48, and 50 disposed about the column segments 42 and interconnected by a central bridge section 52 (FIG. 8).

The most preferred walnut shelling apparatus 54 is schematically illustrated in FIG. 11 and includes an incoming nut hopper 56, nut orienting means 58, conveyor 60, cracking station 62 and collection/separation apparatus 64.

In more detail, the hopper 56 is designed simply to receive incoming walnuts and to feed these to conveyor 60 and orienting means 58. The orienting means may be simply a station where the nuts are manually oriented on conveyor 60, or automated means of conventional nature can be used for this purpose. The conveyor 60 is an endless belt 61 trained around rollers 66, 68 and presenting successive nut-receiving compartments 70 defined by spaced apart sets of upstanding projections 72 along the length of the belt 61. As illustrated in FIGS. 12 and 13, the orienting means 58 and conveyor 60 serve to place individual walnuts 30 within corresponding compartments 70 with the walnuts being on their sides and with the upper and lower ends 34, 36 thereof adjacent the side marginal edges of belt 61.

The cracking station 62 is positioned adjacent the end of conveyor 60 remote from hopper 56. The cracking station includes an uppermost nut-shifting assembly 74 adapted to move the individual nuts 30 through the station. To this end, the assembly 74 includes a pair of depending, shiftable, nut-engaging fingers 76, 78 operatively mounted on an uppermost, elongated track 80. As illustrated in FIG. 14, the fingers 76, 78 are operable to grip individual nuts 30 for passage through cracking station 62.

The station 62 beneath assembly 74 includes a pair of elongated, laterally spaced apart and shiftable base plates 82, 84. Each of the opposed base plates 82, 84 is provided with a pair of spaced apart slots 86, 88, the latter being adapted to receive corresponding guide pins 90 and 92 mounted on underlying supports 94, 96. In this fashion, the base plates 82, 84 can be shifted toward and away from each other by conventional means (not shown), in order to accommodate nuts of various sizes.

The inlet end 98 of station 62 includes a pair of upstanding gauge plates 100, 102 respectively secured to the base plates 82, 84. In addition, each base plate 82, 84 supports a corresponding rotary sander 104, 106 downstream of the associated gauge plate, with each of the sanders including a motor 108, 110 and a sanding wheel 112, 114. Finally, each base plate 82, 84 also supports downstream of each sander a nut compression assembly 116, 118. Each of these includes a selectively actuatable piston and cylinder assembly 120, 122 respectively having an extensible piston rod 124, 126 and an innermost, shell-engaging compression plate 128, 130 coupled to each piston rod.

The collection/separation apparatus 64 is adapted to receive shell fragments and nut meat kernels derived from cracking in station 62. This apparatus has been only schematically depicted, inasmuch as conventional means can be used for such collection and separation. To give but one example, the usual separation roll assemblies used in prior art shelling devices can be employed in this context, or for that matter, the shell kernels may be manually separated from the shell fragments.

The operation of the preferred shelling apparatus 54 will now be described, with reference to FIGS. 11–15, and also FIGS. 1–9, the latter showing in greater detail the configuration of the walnuts at each succeeding processing stage. In particular, nuts properly oriented and conveyed on belt 61 first enter inlet 90 of station 62, whereupon the nuts are individually grasped by the fingers 76, 78 and moved into position between the gauge plates 100, 102, so as to permit positioning of the components of cracking station 62 relative to the individual nut. Specifically, the base plates 82, 84 are moved inwardly or outwardly relative to each other until the gauge plates 100, 102 lightly contact the corresponding upper and lower ends 34, 36 of the individual nut. Such base plate movement also serves to simultaneously position the sanders 104, 106 and nut compression assemblies 116, 118, as will be readily understood from a study of FIGS. 14 and 15.

In the next step, the fingers 76, 78 are shifted rightwardly as viewed in FIG. 14 until the nut is positioned between the sanding wheels 112, 114. At this point, the motors 108, 110 are activated and the ends 34, 36 of the nut are abraded to present respective, flattened compression zones 132, 134 on the ends of the nut shell. These compression zones are illustrated in FIGS. 5 and 6, where it will be observed that the natural fault line 38 is still visible after this sanding operation. Generally speaking, the compression zones should have a diameter of up to about 3 cm, and more preferably from about 1–2 cm.

After the sanding operation is completed, the fingers 76, 78 are again shifted rightwardly to place the nut between the shell-engaging compression plates 128, 130. The piston and cylinder assemblies 116, 118 are then activated in order to move the plates 128, 130 into compressive engagement with the flattened zones 132, 134 on the walnut shell. The maximum total displacement of the plates 128, 130 is up to about 4 mm, more preferably from about 2–3 mm. The rate of movement of the plates should be relatively slow, typically from about 1–60 mm/min. The inward movement of the compression plates 128, 130 serves to crack the walnut shell and permit subsequent collection of the nut meat kernels. Ideally, the shells will crack and fall away from the nut meat kernels, leaving only the central column sections 42 and the flattened ends of the shell, with the nut meat kernels 44–50 in place. It will of course be understood that this ideal cracking may not always occur, owing to variations in individual nut shell sizes, thicknesses and hardness.

After the surrounding nut shell has been cracked (see FIGS. 7 and 15), the shells and the nut meat kernels drop by gravity into the collection/separation apparatus 64. At this point, the nut meat can be conventionally separated, graded and collected as explained previously.

Attention is next directed to FIGS. 16–21 which illustrate another shelling apparatus 136, broadly including a whole nut orienting conveyor 138, initial cracking station 140, nut quadrant orienting conveyor 142, and secondary nut quadrant cracking and nut meat recovery station 144.

In more detail, in the present embodiment it is contemplated that starting walnuts will initially be manually or machine sanded to present a single, flattened compression zone 146 at the top 34 of the nut in the area of natural fault line 38. These nuts are then placed onto the whole nut orienting conveyor 138 which serves to right the individual nuts and deliver them in a properly oriented condition to initial cracking station 140. Specifically, the conveyor 138 includes an elongated bottom wall 148 together with a side mounted, powered conveyor chain 150 supporting a plurality of spaced apart metallic, somewhat V-shaped nut pullers 152. In addition, the initial portion of the bottom wall 148 spaced from station 140 is provided with a roughened surface 154 analogous to sandpaper. The remainder 156 of the bottom wall 148 presents a smooth metallic surface leading to the station 140.

The initial cracking station 140 includes a stationary bottom plate 158 including an elongated, upstanding protrusion 160 presenting a sharp shell-engaging knife edge 162. Further, an opposed piston and cylinder assembly 164 is positioned above plate 158 and includes an extensible rod 166 supporting an upper shell-engaging compression plate 168. The purpose of the initial cracking station 140 is to separate the starting nuts into individual quadrants which are then delivered for subsequent processing.

The quadrant orienting conveyor assembly includes an inlet hopper 170 positioned beneath the initial cracking station 140 to receive the nut quadrants, with a lowermost, angularly oriented conveyor 172 positioned at the lower end of the hopper 170 for receiving quadrants therefrom. The conveyor 172 (see FIG. 20) includes a pair of obliquely oriented side plates 174, 176 which cooperatively form a somewhat V-shaped configuration with a bottommost space 178 between the plates 174, 176. A powered belt 180 having a plurality of spaced apart, upstanding, quadrant-engaging pins 182 secured thereto is located beneath the side plates 174, 176, with the pins 182 extending upwardly through the space 178 and between the side plates. As in the case of bottom wall 148, the side plates 174, 176 at the lower regions thereof are provided with abrasive, sandpaper-like upper surfaces 184, whereas the remainder of the side plate upper surfaces upstream of these roughened surfaces and leading to the secondary cracking station 144 are smooth.

The secondary station 144 includes a nut quadrant receiver 186, along with cracking and recovery apparatus 188 similar to cracking station 62 described previously. The quadrant receiver 186 is best illustrated in FIG. 21, and includes an elongated arm 190 presenting an outermost, V-shaped in cross-section section 192. The arm 190 supports a pivotally mounted hold-down finger 194 adjacent the section 192. Finger 194 is movable by means of a small piston and cylinder assembly 196 having the base 198 thereof pivotally secured to the arm, and with the outer end of the piston rod 200 thereof pivotally coupled with finger 194. In addition, the arm 190 is movable between a first nut quadrant-receiving position depicted in bold lines in FIG. 21 to a downwardly pivoted and inwardly displaced nut quadrant delivery position illustrated in phantom. The receiver 186 is designed to receive properly oriented nut quadrants from the outlet end of conveyor 142, and to successively deliver these quadrants to the secondary station 144.

Secondary station 144 as indicated is very similar to cracking station 62. In particular, the station 144 includes successive gauging, sanding and compression devices 202, 204 and 206, as well as a dual-finger conveyor 208 for shifting individual nut quadrants through these in-line devices. It will be understood in this respect that the devices 202–206 initially gauge each individual quadrant, sand the opposed, pointed ends thereof to present compression surfaces, and thereafter exert compressive forces on the sanded surfaces to facilitate ultimate separation of the nut meat from the shell quadrants.

In the operation of apparatus 136, previously sanded walnuts having the flattened compression surfaces 146 are placed within initial orienting conveyor 138, with each of the nuts being picked up by a successive nut puller 152. As the nut pullers move the nuts along the length of the roughened surface 154, the nuts are turned until, when the nuts reach the smooth surface 156, they are all oriented with the previously flattened surface 146 facing downwardly. In addition, the nuts are oriented, because of their general oval cross-section, with the major axis of the nut being generally aligned with the longitudinal axis of the conveyor 138.

The oriented nuts are then delivered to the initial cracking station 140 and specifically with the surface 146 of each nut atop the knife edge 162 of stationary plate 158. This positioning is illustrated in FIGS. 17-18, where it will be observed that the knife edge 162 is generally transverse to the natural fault line 38 of the nut shell. At this point, the piston and cylinder assembly 164 is actuated to compress the nut between plates 158, and 168. Here again, the maximum displacement of the plate 168 should be on the order of up to 4 mm, and more preferably from about 2-3 mm; the rate of displacement of the plate 168 should be from about 1-60 mm/min. This compression serves to break the nut into four separate quadrants 210, 212, 214, and 216 (see FIG. 19), with each quadrant including a shell segment and a nut meat portion.

The nut quadrants fall by gravity into and through hopper 170, and are then delivered to conveyor 172. Each individual quadrant is in turn engaged by an upstanding pin 182 carried by underlying belt 180, and is so moved upwardly toward the discharge end of the conveyor. The initial sandpaper-like surfaces 184 provided at the lower end of the conveyor serve to properly orient each quadrant as illustrated in FIG. 20, i.e., with the broken faces of the quadrant facing downwardly and engaging the side plates 174, 176.

The aligned and oriented quadrants are then delivered to nut quadrant receiver 186 where they are successively fed into the V-shaped section 192. The arm 190 is then pivoted downwardly and, during such pivoting the piston and cylinder assembly 196 is actuated to close finger 194 onto the upper shell segment of the quadrant. Movement of the arm 190 is this fashion serves to dislodge any improperly formed quadrants and allow these to be collected for separate processing; by the same token, properly formed quadrants are retained in the V-shaped section 192, with finger 194 assuring proper delivery thereof to the secondary station 144.

When the receiver 186 presents a quadrant to the station 144, the transport conveyor 208 grasps the quadrant and successively moves it through the devices 202-206. These latter operate exactly as described previously with reference to station 62, i.e., the respective quadrants are first gauged, then end-sanded, and then subjected to compression to separate the nut meat portions from the shell segments. Final separation, recovery and grading of the nut meat kernels is carried out by conventional means.

Actual laboratory testing of the preferred method in accordance with the invention has demonstrated that nut meat yields are materially enhanced, as compared with conventional processing techniques. For example, using an average of 20 walnut samples where the walnuts were manually sanded to flatten the upper and lower ends thereof, and then subjected to compression in an Instron compression tester (10 mm/min. displacement rate, total displacement 3 mm), yields of from about 14.3-18.2% by weight wet basis were obtained. This corresponded to a nut meat recovery rate of from about 67-84% of the theoretical yield, amounts far in excess of yields conventionally obtained.

Another advantage of the method and apparatus of the invention is that a comparatively large fraction of the nut meat kernels recovered are of relatively large size, which can be sold for a premium price. Finally, inasmuch as greater yields of nut meat are obtained, the resultant collected shells therefore contain less of the nut meat. This is important in that the shells have various industrial uses, such as abrasives, and shells having reduced nut meat fractions are less likely to be objectionable on the basis of excess oil or rancidity.

I claim:
1. A method for cracking walnuts each presenting a shell surface configuration in order to enhance the recovery of nut meat therefrom, said method comprising the steps of:
   altering said surface configuration of each walnut shell to present thereon at least one compression zone,
   said surface configuration-altering step comprising the step of abrading at least one region of each of said walnut shells to present said at least one flattened compression zone;
   thereafter cracking the surface-altered walnut shells by subjecting each walnut to opposed compressive forces at said compression zone and at a point substantially opposite said compression zone,
   said surface alteration serving to distribute compressive forces for cracking of said shells of said walnuts while leaving portions of the nut meats thereof intact; and
   recovering said portions of said nut meats.

2. The method of claim 1, each of said walnut shells presenting an upper end and regions of natural fault lines, said flattened compression surface being provided at said upper end of each of said walnut shells.

3. The method of claim 2, including the step of abrading opposed compression surfaces on said walnut shells, respectively in the regions of the natural fault lines of the walnut shells, and at locations opposed thereto.

4. The method of claim 1, said surface-altering step including the step of cutting said walnut shells substantially along the natural fault lines thereof to present cut lines in said walnut shells.

5. The method of claim 4, said cut lines having a depth of up to about 2 cm, and a length of up to about 3 cm.

6. The method of claim 1, including the step of compressing said walnuts between a pair of opposed plates.

7. The method of claim 6, said plates being shiftable toward each other for exerting said compressive forces.

8. The method of claim 7, the total displacement of said plates being up to about 3 mm.

9. The method of claim 7, said movable plates being moved at a rate of from about 1-60 mm/min.

10. The method of claim 6, said plates each presenting a planar surface for engaging said walnuts.

11. The method of claim 6, one of said plates presenting an elongated, protruding element presenting a sharp, walnut shell-engaging edge.

12. The method of claim 1, including the step of cracking said walnuts into quadrants, each quadrant including a shell segment and a portion of nut meat, said recovering step comprising the steps of abrading the opposed ends of each shell segment, and subjecting said opposed ends to compressive forces for separating the nut meat portions from said segments.

13. A method for cracking walnuts in order to enhance the recovery of nut meat therefrom, said method comprising the steps of:

separating each of said walnuts into quadrants, each of said quadrants including a shell segment presenting a surface configuration and a portion of nut meat;

altering said surface configuration of each walnut shell segment by abrading the opposed ends of each shell segment;

thereafter cracking the surface-altered walnut shell segments by subjecting each walnut shell segment to opposed compressive forces at said abraded, opposed ends for separating said nut meat portions from said walnut shell segments, said surface alteration serving to distribute compressive forces for cracking of said walnut shell segments while leaving said portions of said nut meats intact; and recovering said portion of said nut meats.

* * * * *